US008884612B2

(12) United States Patent  
Hofmockel et al.

(10) Patent No.: US 8,884,612 B2  
(45) Date of Patent: Nov. 11, 2014

(54) CONFIGURABLE NON-CONTACT POSITION SENSOR

(75) Inventors: Klaus Hofmockel, Portland, OR (US); Christopher Miller, Portland, OR (US)

(73) Assignee: Williams Controls, Inc., Portland, OR (US)

( * ) Notice: Subject to any disclaimer, the term of this patent is extended or adjusted under 35 U.S.C. 154(b) by 602 days.

(21) Appl. No.: 13/053,995

(22) Filed: Mar. 22, 2011

(65) Prior Publication Data

US 2011/0234208 A1 Sep. 29, 2011

Related U.S. Application Data

(60) Provisional application No. 61/316,734, filed on Mar. 23, 2010.

(51) Int. Cl.
- *G01B 7/14* (2006.01)
- *F02D 11/10* (2006.01)
- *G01D 5/14* (2006.01)
- *G01D 11/24* (2006.01)

(52) U.S. Cl.
CPC ............ *F02D 11/106* (2013.01); *G01D 5/145* (2013.01); *G01D 11/245* (2013.01); *F02D 2200/0404* (2013.01); *F02D 2200/602* (2013.01)
USPC ...................................... 324/207.2

(58) Field of Classification Search
CPC .......... F02D 11/106; F02D 2200/0404; F02D 2200/602; G01D 5/145; G01D 11/145
See application file for complete search history.

(56) References Cited

U.S. PATENT DOCUMENTS

| | | | |
|---|---|---|---|
| 5,321,980 A * | 6/1994 | Hering et al. | 73/114.36 |
| 5,839,439 A * | 11/1998 | Nierlich et al. | 600/338 |
| 6,116,215 A | 9/2000 | Soleanicov et al. | |
| 7,042,211 B2 * | 5/2006 | Kabashima et al. | 324/207.25 |
| 7,595,720 B2 * | 9/2009 | Bell | 340/438 |
| 7,978,079 B2 * | 7/2011 | Geissler et al. | 340/572.8 |
| 2004/0121671 A1 * | 6/2004 | Skedeleski | 441/79 |
| 2005/0183695 A1 | 8/2005 | Keefover et al. | |
| 2005/0211215 A1 * | 9/2005 | Sturdy et al. | 123/184.53 |
| 2005/0216134 A1 * | 9/2005 | Katrak et al. | 701/1 |
| 2006/0176050 A1 * | 8/2006 | LaPlaca | 324/207.25 |
| 2007/0113824 A1 | 5/2007 | Keefover et al. | |
| 2008/0218158 A1 * | 9/2008 | Carlson et al. | 324/207.2 |
| 2011/0081796 A1 * | 4/2011 | Poh et al. | 439/271 |

OTHER PUBLICATIONS

International Search Report and Written Opinion for Appplication No. PCT/US2011/029415, mailed Nov. 1, 2011.

* cited by examiner

*Primary Examiner* — Melissa Koval  
*Assistant Examiner* — Courtney McDonnough  
(74) *Attorney, Agent, or Firm* — Schwabe, Williamson & Wyatt, P.C.

(57) ABSTRACT

Embodiments herein relate to the general art of motor vehicles, and to the particular field motor vehicle components, especially sensors for electronic throttle controls. Particular embodiments include configurable Hall-effect sensors for use in vehicle controls. In various embodiments, the configurable sensors may include a flexible over molding that may allow the sensor assemblies to achieve an environmental rating conforming International Protection Rating IP 67 and/or IP 66. Additionally, because the sensor assemblies are modular, a single assembly may be configured in any number of different ways, including direct drive and indirect drive applications and multiple different proprietary interface connections, while maintaining compliance with Society of Automotive Engineers (SAE) standards.

23 Claims, 18 Drawing Sheets

CONFIGURABLE NON-CONTACT POSITION SENSOR

CROSS REFERENCE TO RELATED APPLICATIONS

The present application is related to U.S. Patent Application No. 61/316,734, filed Mar. 23, 2010, entitled "CONFIGURABLE NON-CONTACT POSITION SENSOR," the disclosure of which is hereby incorporated by reference in its entirety.

TECHNICAL FIELD

Embodiments herein relate to configurable position sensors, such as those used for throttle controls.

BACKGROUND

Electronic throttle control assemblies are often used in vehicular applications in order to control vehicle operations, such as the speed of the engine, via a sensor sensing the degree of movement of a pedal or other throttle control device, such as a hand control. In such applications, a throttle control device, such as a pedal, is typically mounted for pivotal movement with respect to a floorboard or other component of the vehicle. An electronic sensor is coupled to the pedal and adapted to detect the movement of the pedal. The sensor then sends a corresponding output to another vehicle component to control the vehicle operation.

Currently, throttle control sensor applications require a custom designed sensor and related components. Custom requirements may include, for instance, a certain drive angle, return spring torque, connector, sensor position or configuration, electrical output, etc. A change in a requirement in one or more of these areas requires the development of a new sensor, which adds to lead time and development cost. Thus, it is not only expensive to make such components, but there is virtually no interchangeability in components.

Further, there are various standards that govern the configuration of modular pedal assemblies, such as the Society of Automotive Engineers (SAE) standards. Because of the custom design requirements of the prior sensor modules, no one package is available that can be configurable to multiple applications, including direct or non-direct drive applications, and multiple different proprietary interface connections, while maintaining compliance with the aforementioned standards.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

DETAILED DESCRIPTION OF EMBODIMENTS

Figure 1A:
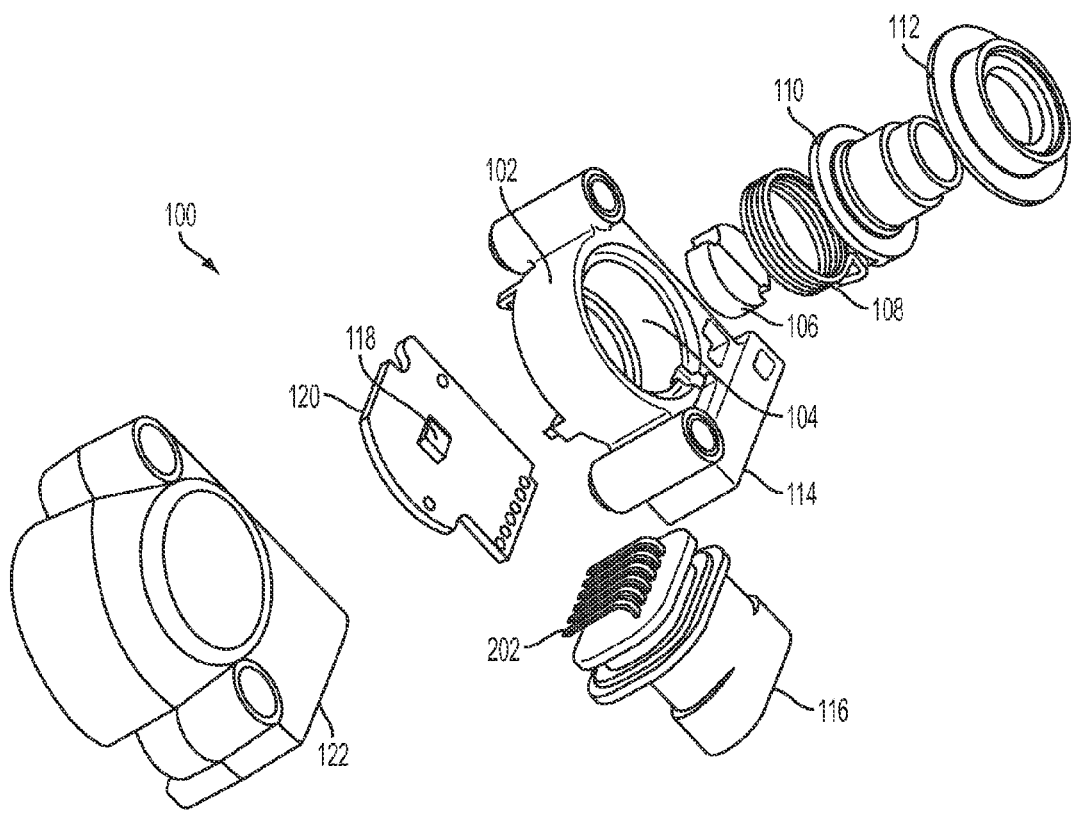
FIG. 1A is an exploded view of an exemplary configurable non-contact sensor assembly that is configured for use with a non-direct drive system (e.g., an overdrive system)

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "NB" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

In various embodiments, a configurable non-contact position sensor is provided that may be modified to conform to a desired set of specifications. In various embodiments, the sensor may include a Hall effect sensing device that detects and/or measures a change in the angle of a magnetic field for instance, in response to the rotation of a rotor such as may be produced when the throttle pedal (or other actuating device) is manipulated.

In various embodiments, the sensor may be configured to be used with either overdrive or direct drive actuation and/or with any connector interface. In various embodiments, the sensor may be configured to detect any degree of rotation, from 0-360 degrees, depending on the actuation system, and/or to provide a variety of return forces. The sensor also may be configured to provide a variety of electrical outputs, for instance, dual Accelerator Pedal Sensor (APS) analog electrical output signal voltage (analog), dual APS Digital Pulse Width Modulation Signal (PWM), APS/Idle Validation Switch (IVS), or dual APS/IVS. In some embodiments, the configurable non-contact sensors disclosed herein may conform to the Society of Automotive Engineers (SAE) standards for non-contact position sensors (for instance, SAE J1483). In particular embodiments, the sensor may be housed in a flexible over molding that may seal the assembly against influx of air, moisture, or debris, and that may allow it to conform to certain environmental standards (for instance, the International Protection Rating IP 66 and/or IP 67 standard).

FIG. 1A illustrates an exploded view of an exemplary configurable non-contact sensor assembly that is configured for use with a non-direct drive system (e.g., an overdrive system), according to various embodiments. In the illustrated embodiment, a configurable non-contact sensor assembly 100 may include a housing 102 adapted to conform to one or more SAE standards, while also accommodating a variety of interchangeable components. In some embodiments, the housing 102 may include an aperture 104 that is sized to accommodate a magnet 106 or other rotation indicator, a spring 108, and a rotor 110. In some embodiments, a rotor cover 112 may be provided that may generally help couple the rotor 110 in the aperture 104.

In some embodiments, the housing 102 also may have a connector port 114 that may be adapted for coupling the sensor assembly 100 to a connector module 116, which, in turn, may have an electrical interface that is configured to couple to the electrical interface of the vehicle. In various embodiments, the configurable non-contact sensor assembly 100 also may include a Hall effect sensing device 118 that may be located adjacent to the housing 102, and generally opposite the aperture 104 and the magnet 106. In various embodiments, the Hall effect sensing device 118 may be oriented and adapted to detect any change in angle of the magnetic field generated by rotation of the magnet 106, for instance 0-360 degrees of rotation of the magnetic field. In various embodiments, the magnet 106 may be a bi-polar disk magnet having a generally solid central section. In other embodiments, the magnet may include one or more magnets forming a concentric ring.

The Hall effect sensing device 118 may be electrically coupled to a circuit board 120, in accordance with various embodiments. In some embodiments, the circuit board 120 may be adapted to fit proximal to (e.g., next to or within) the contours of the sensor assembly 100, adjacent to the housing 102, and within the flexible over molded shell 122 that may enclose all or part of the sensor assembly 100.

Figure 1B:
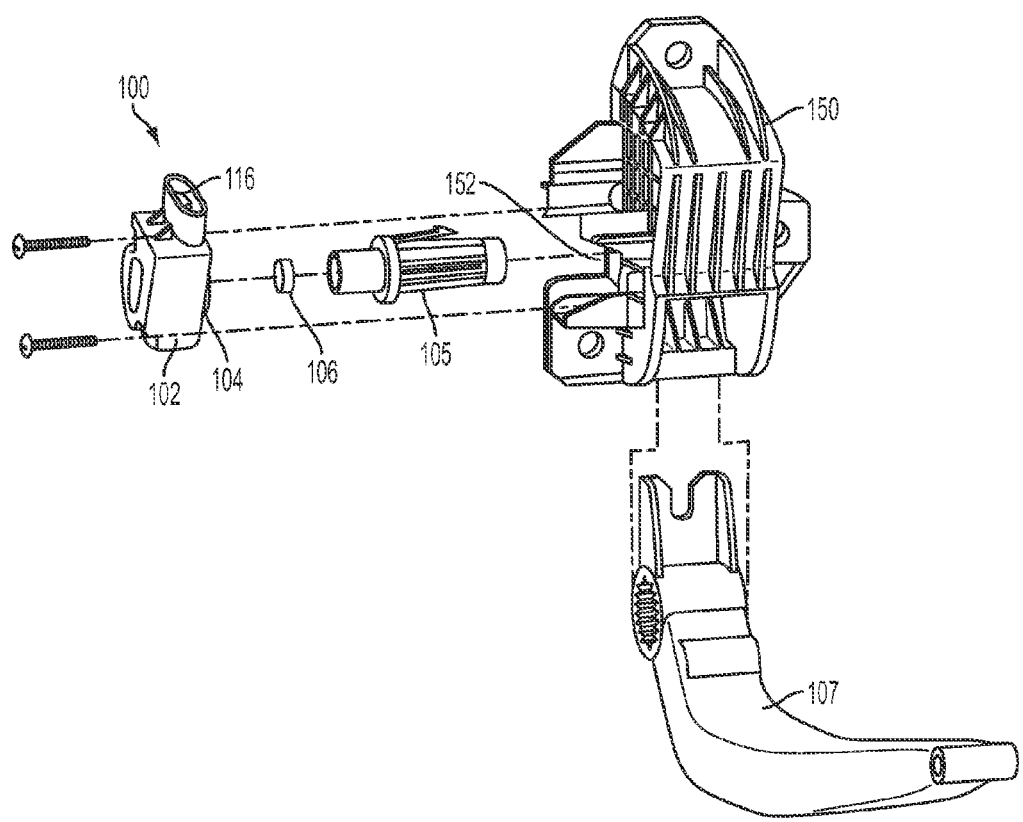
FIGS. 1B, 1C, and 1D are two exploded views and a cross-sectional view of an exemplary configurable non-contact sensor assembly and pedal assembly that is configured for use with a direct drive system.
Figure 1C:
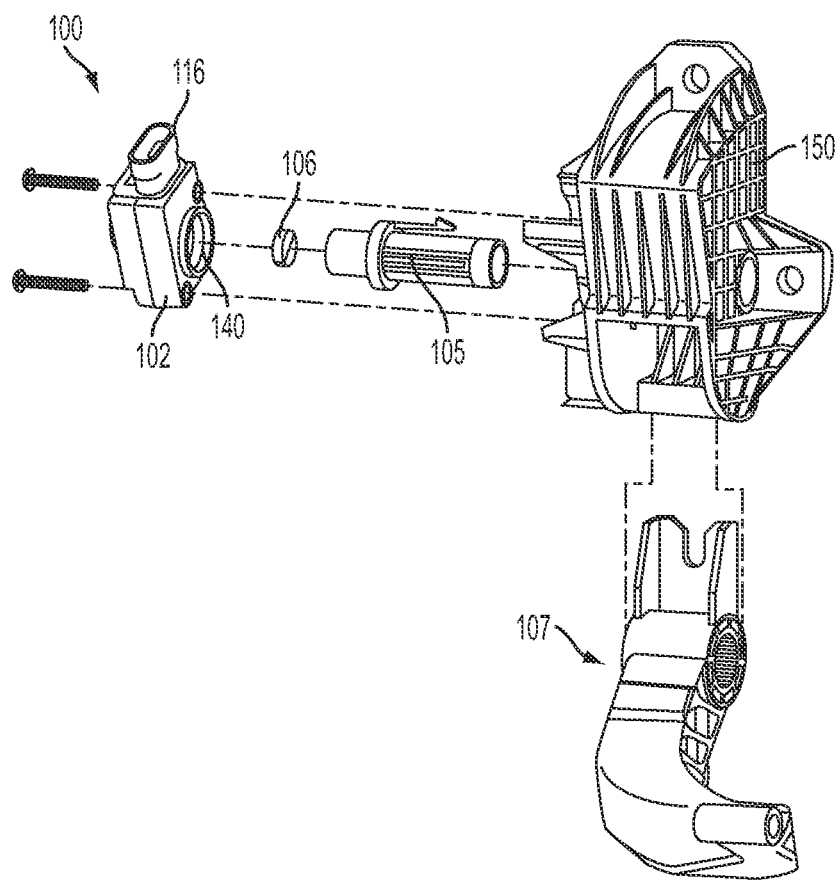
Figure 1D:
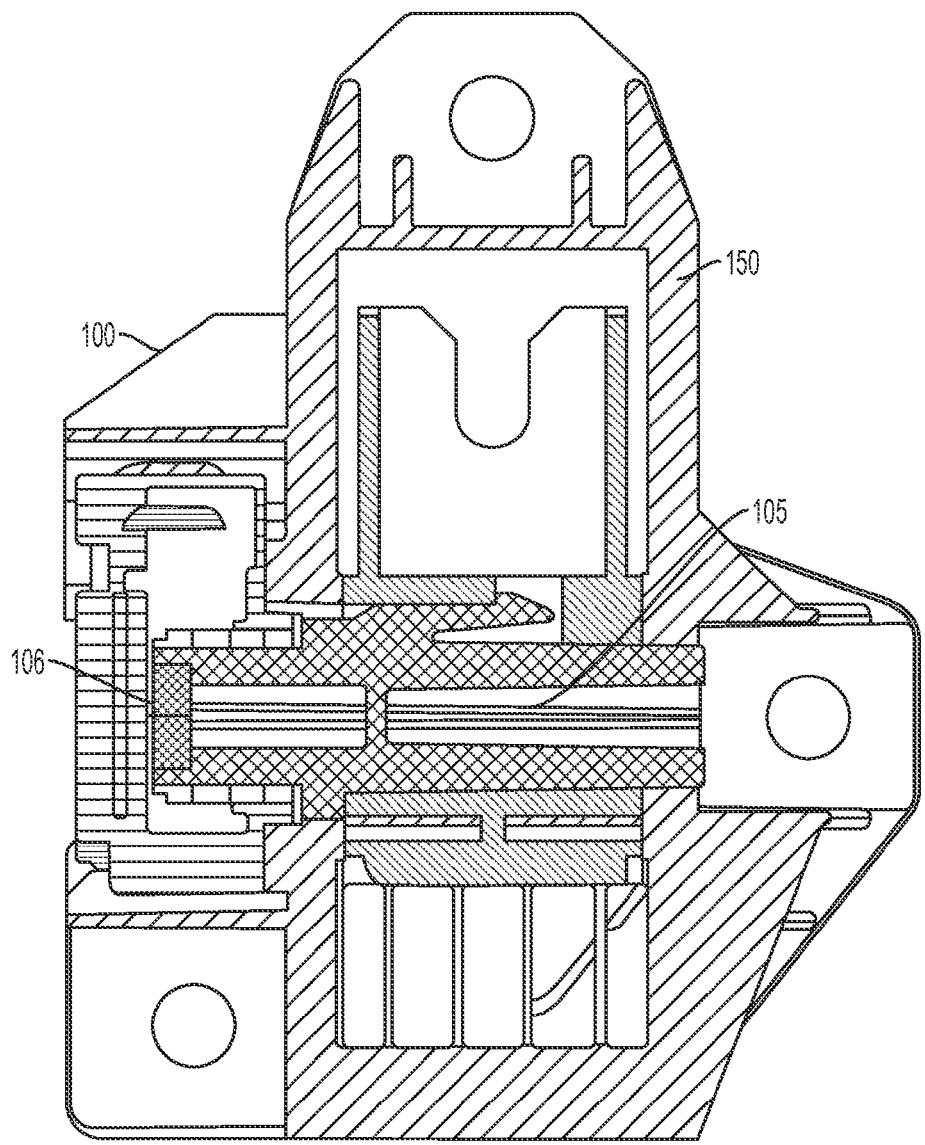

FIGS. 1B, 1C, and 1D illustrate two exploded views and a cross-sectional view of an exemplary configurable non-contact sensor assembly and pedal assembly that is configured for use with a direct drive system, according to various embodiments. In the illustrated embodiment shown in FIG. 1B, a configurable non-contact sensor assembly 100 may include a housing 102 (e.g., within an over mold 122 [not shown in FIG. 1B]) adapted to conform to one or more SAE standards, while also accommodating a variety of interchangeable components. In some embodiments, the housing 102 may include an aperture 104 that is sized to accommodate a direct drive pivot shaft 105 and a magnet 106 or other rotation indicator. In some embodiments, the housing 102 also may be adapted for coupling the sensor assembly 100 to a connector module 116, which, in turn, may have an electrical interface that is configured to couple to the electrical interface of the vehicle.

In various embodiments, the configurable non-contact sensor assembly 100 also may include a Hall effect sensing device 118 (not shown) that may be located adjacent to the housing 102, and generally opposite the aperture 104 and the magnet 106. In various embodiments, the Hall effect sensing device 118 may be oriented and adapted to detect any change in angle of the magnetic field generated by rotation of the magnet 106, for instance 0-360 degrees of rotation of the magnetic field. In various embodiments, the magnet 106 may be a bi-polar disk magnet having a generally solid central section. In other embodiments, the magnet may one or more magnets forming a concentric ring. In embodiments, the direct drive pivot shaft 105 may be configured to couple to pedal assembly 150, which may include an aperture 152 for receiving the direct drive pivot shaft 105. In some embodiments, the pedal assembly 150 also may couple to a lever arm 107 and to the direct drive pivot shaft 105. In embodiments, depressing the lever arm 107 may cause the direct drive pivot shaft 105 to rotate within the pedal assembly 105.

Like the embodiment shown in FIG. 1A, a Hall effect sensing device 118 of embodiment 1B-D may be electrically coupled to a circuit board 120 (not shown), in accordance with various embodiments. In some embodiments, the circuit board 120 may be adapted to fit proximal to (e.g., next to or within) the contours of the sensor assembly 100, adjacent to the housing 102, and within the flexible over molded shell 122 (not shown) that may enclose all or part of the sensor assembly 100. As described below in greater detail, in some embodiments, the flexible over molding material may fill the empty space within the sensor housing, which may provide protection against incursion by water or debris.

Figure 1G:
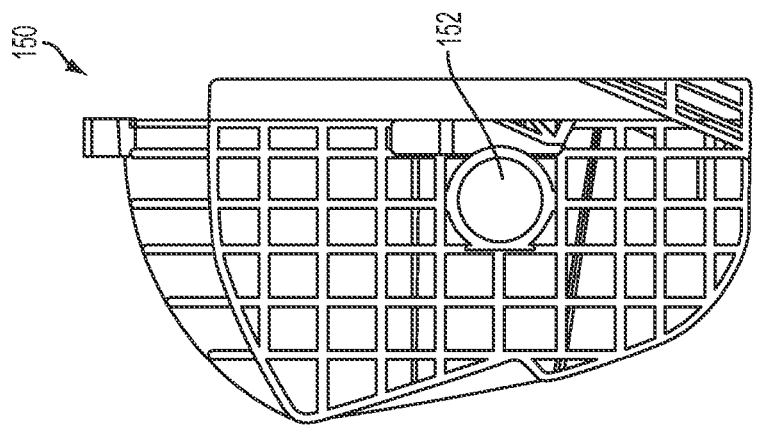
FIGS. 1E, 1F, and 1G are a first side view, a bottom view, and a second (opposite) side view of an exemplary sensor and pedal assembly that is configured for use with a direct drive system.
Figure 1F:
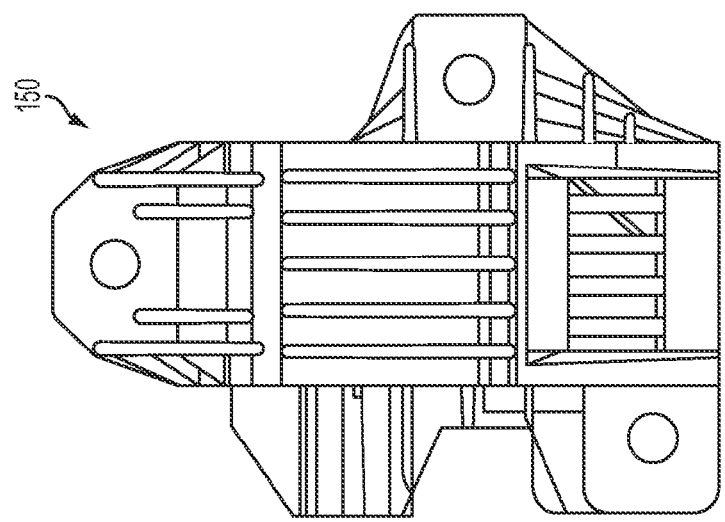
Figure 1E:
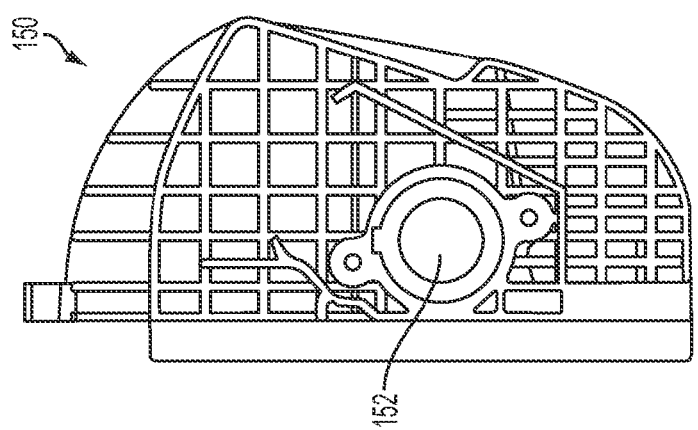

FIGS. 1E, 1F, and 1G illustrate a first side view, a bottom view, and a second side view of an exemplary pedal assembly 150 that is configured for use with a direct drive system, in accordance with various embodiments. Referring to FIG. 1E, the pedal assembly 150 includes an aperture 152 configured to receive a direct drive pivot shaft 105.

Figure 1H:
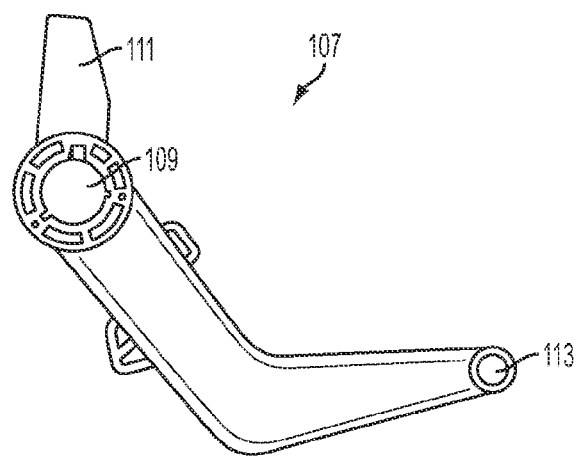
FIGS. 1H, 1I, and 1J are three views of an exemplary lever arm that is configured for use with a direct drive system.
Figure 1I:
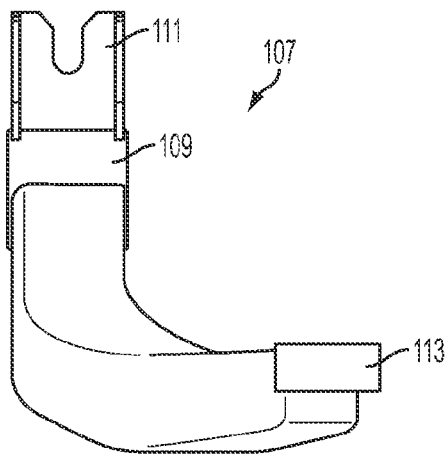
Figure 1J:
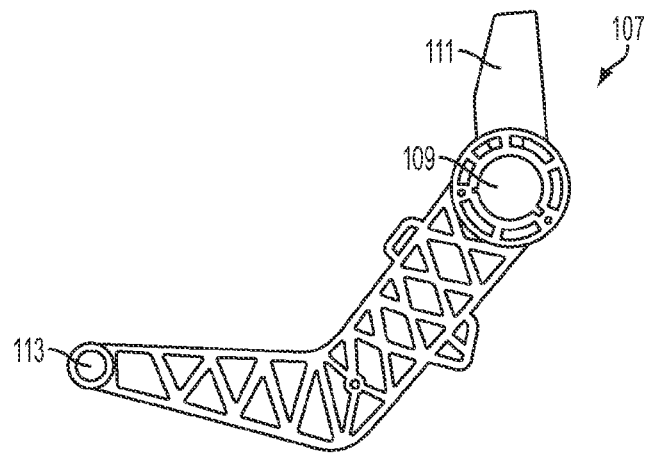
Figure 1K:
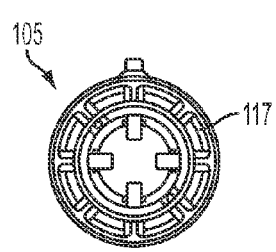
FIGS. 1K, 1L, 1M, 1N, 1O, and 1P are five views of an exemplary direct drive pivot shaft that is configured for use with a direct drive system, all in accordance with various embodiments.
Figure 1L:
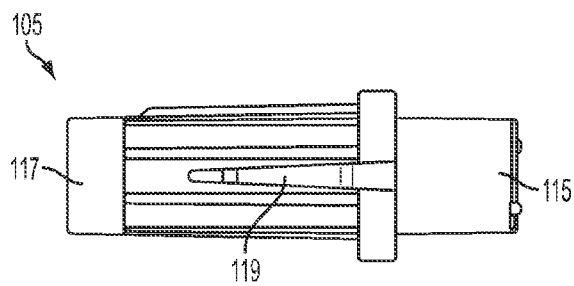
Figure 1M:
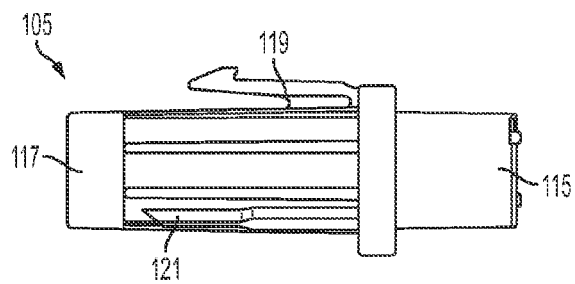
Figure 1N:
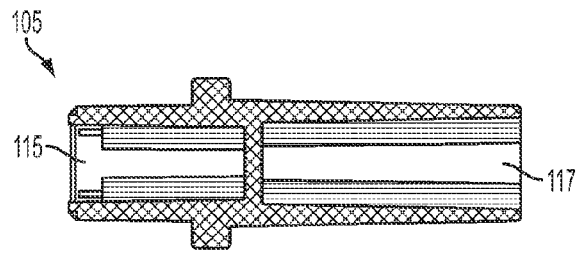
Figure 1O:
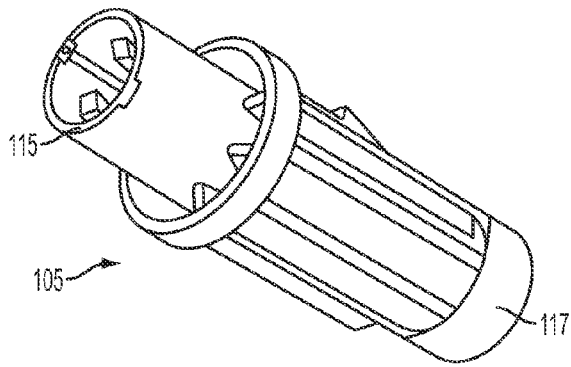
Figure 1P:
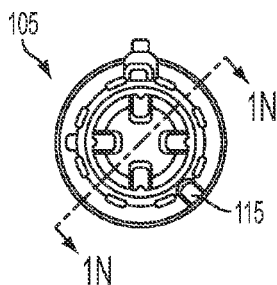

FIGS. 1H, 1I, and 1J illustrate three views of an exemplary pedal or lever arm 107 that is configured for use for example with a direct drive system, in accordance with various embodiments. Referring to FIG. 1H, the lever arm 107 may have an adapter end 111 that is configured to couple to a pedal assembly 150 (shown in 1E-G), a shaft receptor 109, which may be configured to couple with a direct drive pivot shaft 105

(shown in 1B-D), and an actuating end 113, which may be configured to couple to an actuating component, such as a treadle or pedal.

FIGS. 1K, 1L, 1M, 1N, 1O, and 1P illustrate five views of an exemplary direct drive pivot shaft 105 that is configured for use with a direct drive system, in accordance with various embodiments. In various embodiments, the direct drive pivot shaft 105 may include a first end 115 adapted to couple to a magnet 106, a second end 117 adapted to fit within a pedal assembly 150, at least one retention clip 119 for retaining the direct drive pivot shaft in the pedal assembly 150, and one or more coupling elements 121 adapted to couple the direct drive pivot shaft 105 to a lever arm 107. In use, actuating the lever arm 107 may cause the direct drive pivot shaft 107 to rotate within the sensor assembly 100, and in various embodiments, rotation of the direct drive pivot shaft 105 rotates the magnet 106 relative to a home position.

Figure 2:
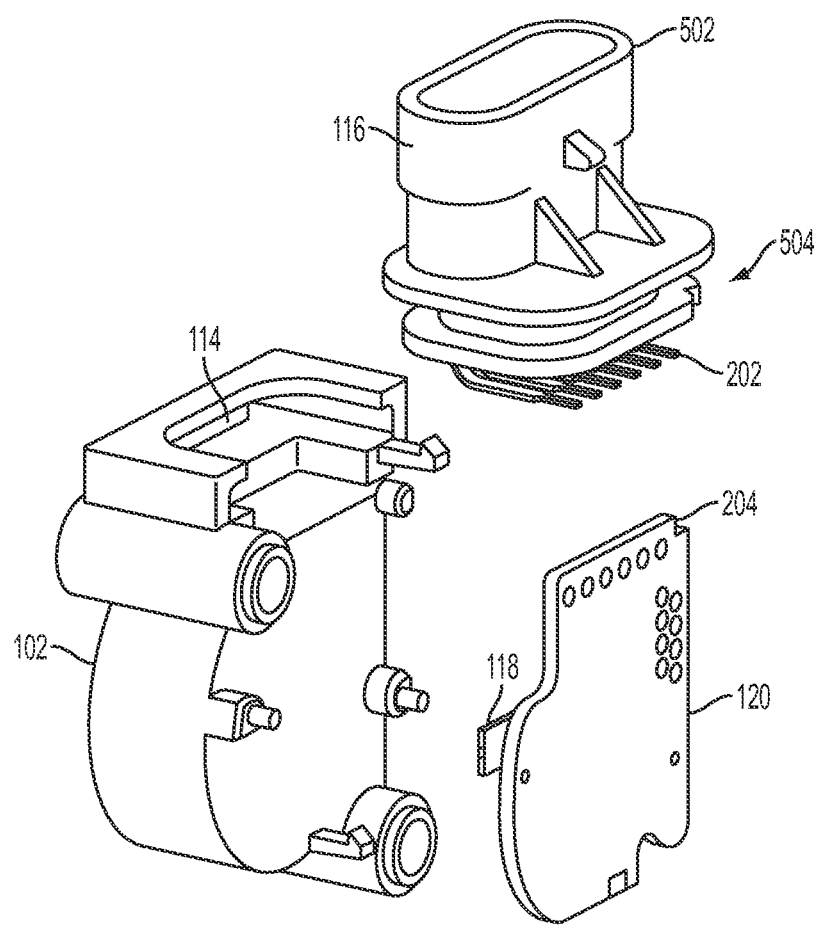
FIG. 2 is an exploded view of an exemplary sensor body, connector module, Hall effect sensing device, and circuit board, in accordance with various embodiments.

FIG. 2 is an exploded view illustrating components of an example sensor assembly including housing 102, connector module 116, Hall effect sensing device 118, and circuit board 120, in accordance with various embodiments. Housing 102 may have a connector port 114 having coupling features that are adapted to generally mate with corresponding coupling features of a connector module 116. Although a particular connector module 116 is illustrated in FIG. 2, different connector modules may used that have body and electrical interface configurations are adapted to interface with the proprietary interface components of a specified vehicle. Thus, a connector module 116 may be exchanged with another connector module at the connector port 114. The configurable non-contact sensor may be configured to interface with any vehicle. This modular configurability may reduce the manufacturing costs of and lead time required to produce a configurable non-contact sensor adapted to fit any vehicle. In specific, non-limiting examples, the connector port 114 may include one or more tapered groves, for instance u-channels that may allow it to couple to a connector module 116. In some embodiments, the connector module 116 may include one or more corresponding crush-ribs that may be displaced when the connector module is inserted into the u-channels of the connector port 114. For instance, the insertion operation may displace the crush-rib material and lock the connector module securely in place. The connector module 116 may have any number of connector pins 202, as long as they physically fit inside the connector module 116, and any pin shape and material may be used. The sensor coupling end 504 of the connector module 116 may be a standard size and shape for each variant of the connector module 116, but any other feature, such as the module material, shape of the vehicle connection end 502, pin size, style, length and material can change to fully accommodate the needs of any customer or situation. In some embodiments, the connector module 116 may accommodate flying leads, in which a harness connector may extend from the connector module 116 with a vehicle connector at the end of the attached harness (not shown). In use, any desired connector module may be selected and installed based on the particular needs of a given vehicle, customer, or situation.

The connector module 116 may have one or more electrical coupling pins 202 that may form an electrical connection with one or more electrical interfaces 204 on the circuit board 120, in accordance with various embodiments. In some embodiments, the connector module may form an electrical coupling between the circuit board and the vehicle's electronic system.

Figure 3A:
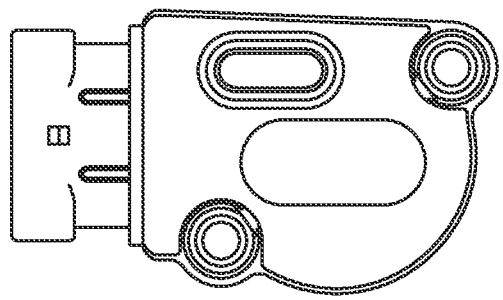
FIGS. 3A-C are front (3A) and back (3B, 3C) views of a configurable non-contact sensor assembly configured for use with a direct drive system (3B) and a non-direct drive system (3C), in accordance with various embodiments [not clear to me what you mean]
Figure 3B:
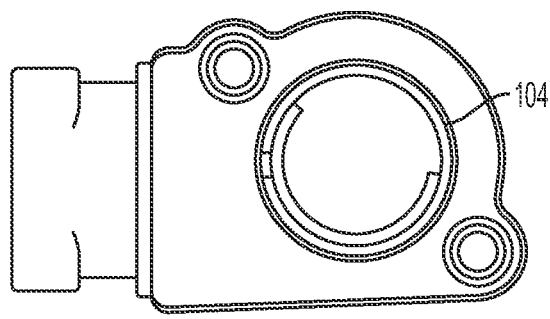
Figure 3C:
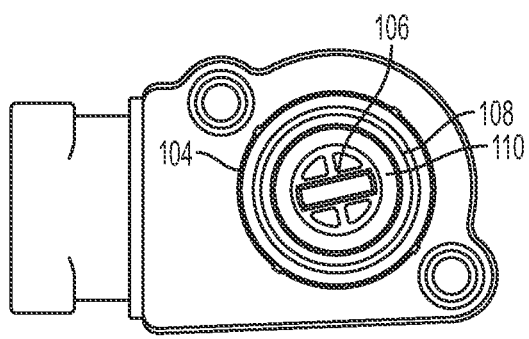
Figure 4A:
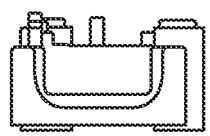
FIGS. 4A-D are four different views of one example of a sensor body, in accordance with various embodiments.
Figure 4B:
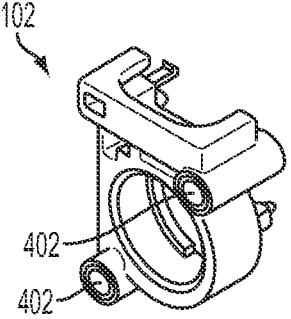
Figure 4C:
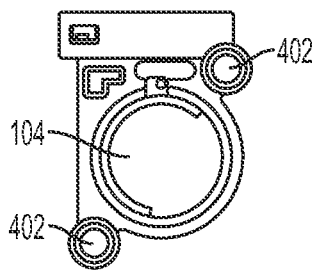
Figure 4D:
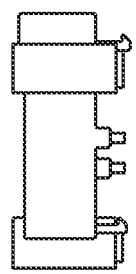
Figure 5A:
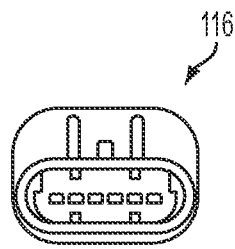
FIGS. 5A-E are five different views of one example of a connector module, in accordance with various embodiments.
Figure 5B:
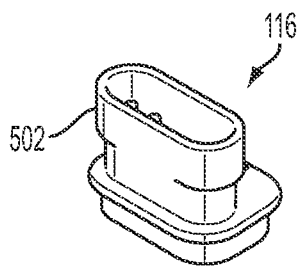
Figure 5C:
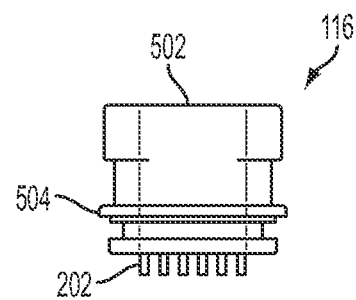
Figure 5D:
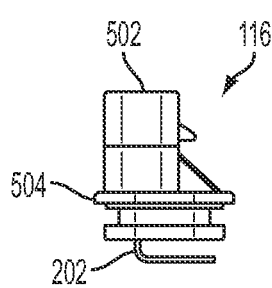
Figure 5E:
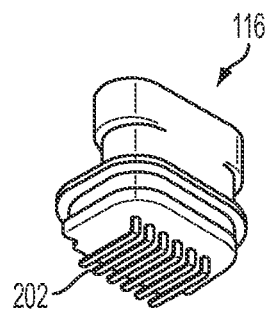
Figure 6A:
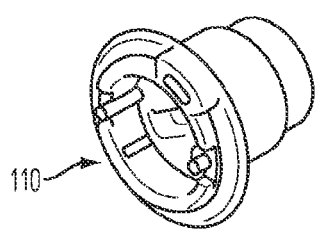
FIGS. 6A-E are five different views of one example of a rotor, in accordance with various embodiments.
Figure 6B:
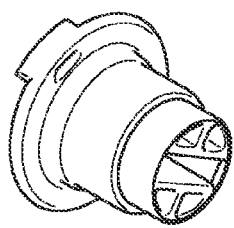
Figure 6C:
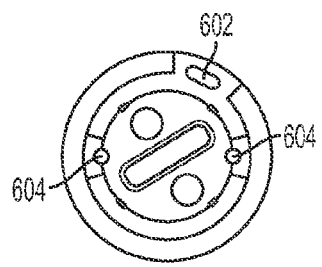
Figure 6D:
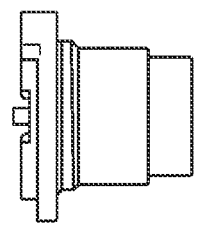
Figure 6E:
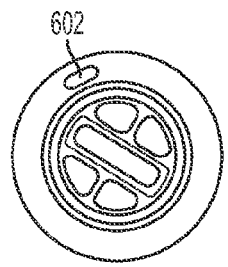
Figure 7A:
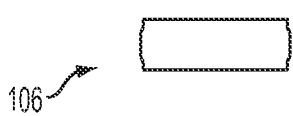
FIGS. 7A-D are four different views of one example of a magnet, in accordance with various embodiments.
Figure 7B:
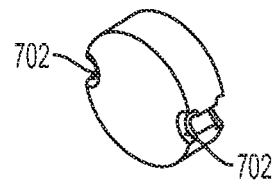
Figure 7C:
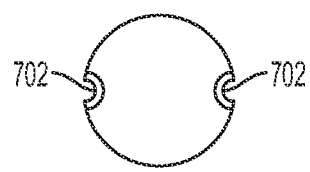
Figure 7D:
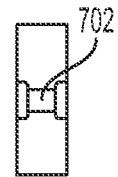
Figure 8A:
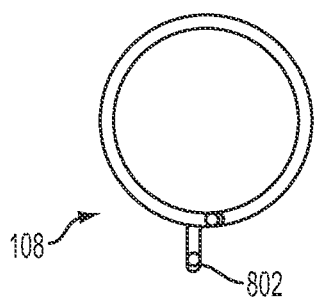
FIGS. 8A-D are four different views of one example of a spring, in accordance with various embodiments.
Figure 8B:
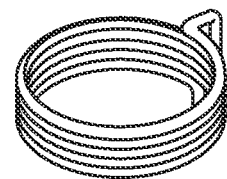
Figure 8C:
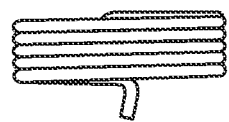
Figure 8D:
Figure 9A:
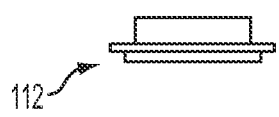
FIGS. 9A-D are four different views of one example of a rotor cover, in accordance with various embodiments.
Figure 9B:
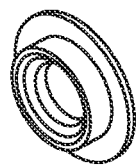
Figure 9C:
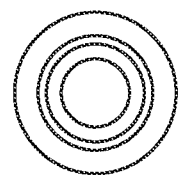
Figure 9D:
Figure 10A:
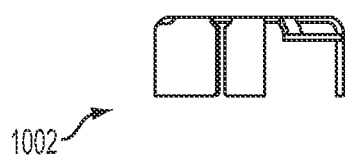
FIGS. 10A-D are four different views of one example of a magnetic shield, in accordance with various embodiments.
Figure 10B:
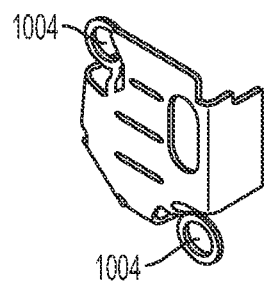
Figure 10C:
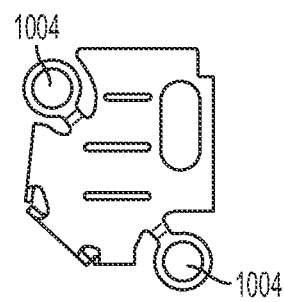
Figure 10D:
Figure 11A:
FIGS. 11A-D are four different views of one example of a circuit board and sensor, in accordance with various embodiments.
Figure 11B:
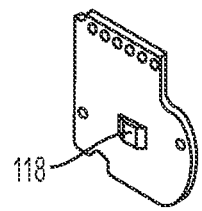
Figure 11C:
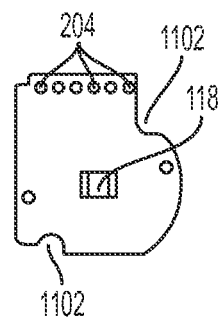
Figure 11D:
Figure 12A:
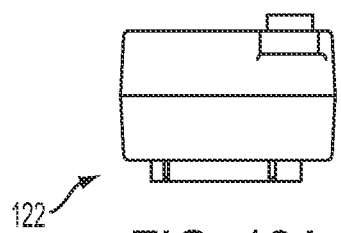
FIGS. 12A-D are four different views of one example of an over molded outer shell, in accordance with various embodiments.
Figure 12B:
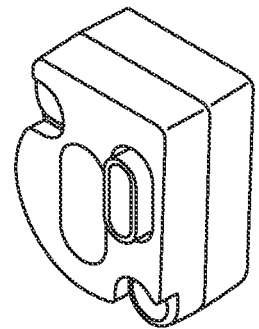
Figure 12C:
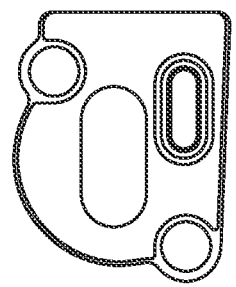
Figure 12D:
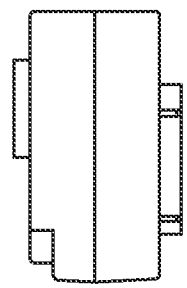

FIGS. 3A-C illustrate front (3A) and back (3B, 3C) views of a configurable non-contact sensor assembly configured for use with a direct drive system (3B) and a non-direct drive system (3C). Referring to FIG. 3B, when the non-contact sensor assembly is configured for use with a direct-drive system, the aperture 104 may not contain a rotor 110, magnet 106, and/or spring 108, in some embodiments. In some embodiments, rotation of the axle and a corresponding magnet (not shown) within aperture 104 may cause rotation of the magnet, which in some embodiments may be connected to the axle end disposed in the aperture 104. In one specific example, the axle may be rotated about 15 to 20 degrees. In such systems, the Hall effect sensing device 118 may be configured to detect rotation of the magnetic field from about 0 to about 20 degrees of rotation. In other examples, the degree of direct drive rotation may be more or less than this range.

By contrast, as shown in FIG. 3C, the aperture 104 may contain a rotor 110, a spring 108, and a magnet 106 such that the sensor is adapted for indirect drive (see FIG. 1A). Rotation of the axle (not shown) may be amplified by the rotor 110 such that a 15-20 degree rotation of the axle results in a larger rotation of the magnetic field, for instance, from about 50 to about 75 degrees of rotation, in certain embodiments. In such systems, the Hall effect sensing device 118 may be configured to detect rotation of the magnetic field from about 0 to about 75 degrees of rotation. In some embodiments, a wall or partition partially or completely separates the magnet 106 from the sensing device 118.

FIGS. 4A-D illustrate four different views of an example housing 102, in accordance with various embodiments. In embodiments, the sensor body may be made of any sturdy material, for instance, metal, plastic, nylon or other composite materials. Referring to FIG. 4, in some embodiments, the housing 102 may include one or more mounting holes 402, and in particular embodiments, the housing 102 may be configured to conform to one or more SAE standards, for instance SAE J1843.

FIGS. 5A-E illustrate five different views of an example of a connector module 116, in accordance with various embodiments. Referring to FIG. 5, in some embodiments, the connector module may have a vehicle connection end 502 for coupling physically and/or electrically with the input configuration of a specific make and/or model of vehicle. In addition, the connector module may have a standard sensor coupling end 504, for physically and/or electrically coupling with the sensor assembly, for instance at a connector port 114, in accordance with some embodiments. The connector module 116 also may have one or more connector pins 202, for coupling to a sensor, in some embodiments.

FIGS. 6A-E illustrate five different views of an example of a rotor 110, in accordance with various embodiments. Referring to FIG. 6, the rotor 110 may be configured to be coupled to the magnet 106 and the spring 108, and to fit within the aperture 104. In some embodiments, the rotor may have one or more spring retention pins 602 that couple the rotor 110 to the spring 108 such that the spring 108 may exert rotational resistance on the rotor 110. In particular embodiments, the rotor 110 may include one or more magnet retainers 604 that couple the magnet 106 to the rotor 110 such that rotation of the rotor 110 causes rotation of the magnet 106. In some embodiments, the magnet retainers 604 may include heat stake posts that may be deformed by using heat to displace some of the material of the post to act as a retaining feature for the magnet 106. In various embodiments, the rotor 110 interface may have a 1:1 coupling ratio, so it does not amplify the amount of rotation. For instance, in particular embodiments, the physical rotation of the rotor 110 may be translated with a ratio of 1:1 into a rotation of the magnetic field observed by the Hall effect sensing device 118 on the printed circuit board assembly 120.

FIGS. 7A-D illustrate four different views of an example of a magnet 106, in accordance with various embodiments. Referring to FIG. 7, the magnet 106 may be generally round or disc-shaped, may be configured to fit within the aperture 104, and may be configured to fit within the spring 108 and/or within the rotor 110, in some embodiments. In certain embodiments, the magnet 106 may include one or more notches or grooves 702 that help couple the magnet 106 to the magnet retainers 604. In particular embodiments, the size and material of the magnet 106, for instance neodymium iron boron (NdFeB), may be selected to provide the maximum magnetic flux "B," and/or to provide magnetic shielding from external noise sources. In other embodiments, if additional shielding and/or magnetic flux optimization is not desired, a smaller magnet 106 may be substituted (not shown).

FIGS. 8A-D illustrate four different views of an example of a spring 108, in accordance with various embodiments. Referring to FIG. 8, the spring 108 may be a coil spring or any other type of spring that may provide rotational resistance and that may fit within the aperture 104 and around the magnet 106. In some embodiments a medium-gauge spring may be used, although heavier- or lighter-gauge springs may be used to create stronger or weaker rotational resistance, as suits the particular application. In some embodiments, the spring may include a retention arm 802, for instance, for coupling to the rotor 110.

FIGS. 9A-D illustrate four different views of an example of a rotor cover 112, in accordance with various embodiments. Referring to FIG. 9, the rotor cover 112 may be adapted to couple to the housing 102 or to the rotor 110. In some embodiments, the rotor cover 112 may couple to the housing 102 via ultrasonic welding. In other embodiments, the rotor cover 112 may be coupled to the housing 102, for instance, using a press-fit design or by utilizing adhesive.

FIGS. 10A-D illustrate four different views of an example of a magnetic shield 1002, in accordance with various embodiments. Referring to FIG. 10, the magnetic shield 1002 may be used to shield the Hall effect sensing device 118 from magnetic interference, according to certain embodiments. The magnetic shield 1002 is adapted to be coupled to the housing 102, and to fit within the SAE requirements. One or more shield mounting holes 1004 may be provided, and in some embodiments, the shield mounting holes 1004 may couple to the mounting holes 402 that may be provided in the housing 102.

FIGS. 11A-D illustrate four different views of an example of a circuit board 120, in accordance with various embodiments. Referring to FIG. 11, the circuit board 120 may be configured to fit within the SAE requirements, and in various embodiments, may be configured to match the profile or contour of the housing 102, and positioned adjacent to a second side of the housing. In various embodiments, the PCB and sensor may be sized to fit within a second cavity of the housing (not shown). In some embodiments, the circuit board 120 may be configured to couple to a Hall effect sensing device 118. In other embodiments, the circuit board may include one or more receptacles 204 for electrical connector pins 202 of connector module 116. In particular embodiments, the circuit board 120 may have cutouts, holes, or notches 1102 that mate with and/or couple with the shield mounting holes 1004 or mounting holes 402. In other embodiments, the sensor may provide any of a variety of electrical outputs, for instance, dual APS analog, dual APS PWM, APS/IVS, or dual APS/IVS. In some embodiments, the housing 102 and/or circuit board 118 may include one or more stops that may allow the circuit board 120 and/or the sensing device 118 to stand off the back side of the housing 102, leaving a space between the sensing device 118 and the housing 102. In some embodiments, the flexible over molding 122 may enter and/or fill this space when it is applied to the sensor assembly 110. As described below in greater detail, this may contribute to the water resistance of the sensing device 118, and may allow it to achieve compliance with the IP 66/or IP 67 environmental standard.

In embodiments, the circuit board 120 may be programmable. Particular embodiments of the circuit board 120 may include a Melexis 90316 device (for instance, the dual or single die version), and may include any of various versions of processing circuitry. In one specific, non-limiting example, the circuit board 120 may be programmable for dual analog APS or dual PWM APS. In this example, the processing circuitry may include EMC protection circuits and, optionally, hardware selectable input and output voltage regulator and amplifier circuits for each of the two channels. In another specific, non-limiting example, the circuit board 120 may be programmable for APS/IVS and/or PWM/IVS. In this example, the processing circuitry may include EMC protection circuits, an input voltage regulator, and output signal processing, for instance, an amplifier and short circuit protection. In yet another specific, non-limiting example, the circuit board 120 may be programmable for APS/IVS and/or PWM/IVS. In this example, the processing circuitry may include EMC protection circuits and an input voltage regulator, and the output signal may include optically isolated switches to accommodate potentially dangerous high voltage signals. In yet another specific, non-limiting example, the circuit board 120 may be programmable for dual analog APS or dual PWM APS and APS/IVS and/or PWM/IVS. In this example, the processing circuitry may include EMC protection circuits, an input voltage regulator, and output signal processing, for instance, an amplifier and short circuit protection, and the final customer output signal may be CAN (Controller Area Network) to accommodate specific customer applications.

FIGS. 12A-D illustrate four different views of an example of an over molded outer shell 122, in accordance with various embodiments. Referring to FIG. 12, the over molded outer shell 122 may be flexible enough to accommodate a wide variety of components, while still fitting within the SAE requirements. The over molded outer shell 122 may be made from any strong, flexible, or elastomeric material, such as rubber, latex, nylon, or other composite materials. In specific examples, the over molded outer shell 122 may be made of low pressure, hot melt adhesive-based polymer that provides excellent bonding properties for use with plastics and glass and fiber based circuit boards. Specific examples of such polymers include high performance thermoplastic resins, for instance with a polyamide or polyester base resin.

In some embodiments, the over mold may be injection-molded into and around the sensor such that it seals the sensor from incursion by moisture, air, or debris. In some embodiments, the flexible over molding material may not only enclose the sensor, but it also may penetrate into the inner compartments of the sensor housing and fill up some or all of the empty space inside, creating a water- and air-tight seal around the components. For instance, in some embodiments, following the application of the flexible over molding material, the sensor may no longer sit within an air-filled cavity. Rather, in certain embodiments, the over molding may leave essentially no air space inside the housing. This may be advantageous because the sensor may be exposed to temperature changes during normal operation that otherwise lead to air expansion or contraction that might cause a vacuum to form, for instance on the connector, allowing moisture to enter the sensor. In some embodiments, the over molded outer shell 122 may meet the International Protection Rating IP 67 and/or IP 66 water protection requirements. For instance, the IP 67 standard requires the device to be dust tight and capable of withstanding immersion in water up to 1 meter. The IP 66 standard requires the device to be dust tight and capable of withstanding water projected in powerful jets against the enclosure from any direction.

In use, the sensor may be mounted to a mechanical device that provides rotary input. In embodiments, when used in "direct drive" applications, the rotating input device (shaft or axle) may have a diametrically magnetized disc magnet mounted on the end of the shaft, as described above, which may interface with the rotor cavity. In other embodiments, when used in overdrive applications, the optional rotor with magnet, return spring, and rotor cover may be installed prior to over molding the sensor housing.

Other embodiments may include methods and kits for assembling a sensor assembly. The methods may include selecting a direct drive or overdrive (indirect drive) application, selecting a sensor body, selecting and installing a connector module in the sensor body, installing a magnet in the rotor (for overdrive applications), installing a return spring on the rotor (for overdrive applications), installing the rotor assembly in the rotor cavity (for overdrive applications), pre-loading the rotor assembly (for overdrive applications), installing the circuit board assembly (for instance soldering the connections to the connector module), over molding the housing with low pressure over mold material, and programming and/or testing the device (for instance, on the pedal for direct drive applications and either on the pedal or off the pedal for indirect drive applications).

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

We claim:

1. A configurable non-contact position sensor assembly comprising:
   a housing;
   a rotation indicator disposed within and rotatably coupled to the housing;
   a Hall effect sensing device disposed within or adjacent to the housing and adapted to detect a change in an angle of a field generated by the rotation indicator; and
   a flexible over molded shell enclosing all or part of the sensor assembly and adapted to seal at least a portion of the sensor assembly against influx of air, moisture, and/or debris; wherein the flexible over molded shell at least partially fills an empty space within the housing; and wherein the flexible over molded shell substantially fills a space between the Hall effect sensing device and the housing.

2. The configurable non-contact position sensor assembly of claim 1, wherein the flexible over molded shell comprises a low pressure, hot melt adhesive-based polymer.

3. The configurable non-contact position sensor assembly of claim 2, wherein the flexible over molded shell comprises a thermoplastic resin.

4. The configurable non-contact position sensor assembly of claim 3, wherein the thermoplastic resin comprises a polyamide or polyester base.

5. The configurable non-contact position sensor assembly of claim 1, wherein the flexible over molded shell fills substantially all empty space within the housing.

6. The configurable non-contact position sensor assembly of claim 1, wherein the sensor assembly conforms to a standard comprising International Protection Rating IP 67 and/or IP 66.

7. The configurable non-contact position sensor assembly of claim 1, wherein the sensor assembly comprises a partition separating the rotation indicator and the Hall effect sensing device.

8. The configurable non-contact position sensor assembly of claim 1, wherein the rotation indicator comprises a bipolar disk magnet having a generally solid center portion or a magnet comprising two or more concentric rings.

9. The configurable non-contact position sensor assembly of claim 1, wherein the sensor assembly is a direct drive sensor assembly, and the sensor assembly further comprises a direct drive pivot shaft coupled to the rotation indicator and configured to rotate relative to the housing.

10. The configurable non-contact position sensor assembly of claim 9, wherein the Hall effect sensing device is configured to detect rotation of the rotation indicator of from 0 degrees to about 20 degrees.

11. The configurable non-contact position sensor assembly of claim 1, wherein the sensor assembly is an indirect drive sensor assembly, wherein the sensor assembly further comprises a rotor and an indirect drive shaft, wherein the indirect drive shaft is configured to rotate relative to the housing, and wherein the rotor is configured to amplify rotation of the indirect drive shaft and transmit the amplified rotation to the rotation indicator.

12. The configurable non-contact position sensor assembly of claim 11, wherein the rotor is configured to cause rotation of the rotation indicator of 50-75 degrees in response to 15-20 degrees of rotation of the indirect drive shaft.

13. The configurable non-contact position sensor assembly of claim 11, wherein the Hall effect sensing device is configured to detect from 0 degrees to 75 degrees of rotation of the rotation indicator.

14. The configurable non-contact position sensor assembly of claim 1, wherein the sensor assembly further comprises a magnetic shield configured to shield the Hall effect sensor from external magnetic forces.

15. The configurable non-contact position sensor assembly of claim 1, wherein the housing further comprises a connector port adapted to couple the sensor assembly to a connector module.

16. The configurable non-contact position sensor assembly of claim 15, wherein the connector module comprises a first electrical interface configured to couple to a second electrical interface, wherein the second electrical interface is a vehicle interface.

17. The configurable non-contact position sensor assembly of claim 1, wherein the sensor assembly is adapted to conform to one or more Society of Automotive Engineers (SAE) standards.

18. The configurable non-contact position sensor assembly of claim 1, wherein the sensor assembly is adapted to provide a dual Accelerator Pedal sensor (APS) electrical output signal, an analog electrical output signal, a dual APS Digital Pulse Width Modulation (PWM) signal, an APS/Idle Validation Switch (IVS) signal, and/or a dual APS/IVS signal.

19. A configurable non-contact position sensor assembly comprising:
   a housing;
   a rotation indicator disposed within and rotatably coupled to the housing;
   a Hall effect sensing device disposed within or adjacent to the housing and adapted to detect a change in an angle of a field generated by the rotation indicator; wherein the sensor assembly comprises a partition separating the rotation indicator and the Hall effect sensing device; and
   a flexible over molded shell enclosing all or part of the sensor assembly and adapted to seal at least part of the sensor assembly against influx of air, moisture, and/or debris; wherein the flexible over molded shell at least partially fills an empty space within the housing; and wherein the flexible over molded shell substantially fills a space between the Hall effect sensing device and the housing.

20. A method for assembling a configurable non-contact sensor assembly, comprising:
   selecting a direct drive or indirect drive application;
   selecting a sensor body;
   selecting a connector module;
   installing the connector module in the sensor body;
   selecting a rotation indicator;
   installing the rotation indicator in the sensor body;
   selecting a circuit board assembly;
   installing the circuit board assembly within or adjacent to the sensor body; and
   over molding the sensor body and circuit board assembly with low pressure hot melt over mold material; wherein the over mold material at least partially fills an empty space within the sensor body; and wherein the over mold material substantially fills a space between the rotation indicator and the sensor body.

21. The method of claim 18, wherein the application is an indirect application, and wherein the method further comprises:
   selecting a rotor;
   selecting a return spring;
   installing the rotation indicator and the return spring on the rotor to form a rotor assembly; and
   installing the rotor assembly in a rotor cavity in the sensor body.

22. The configurable non-contact position sensor of claim 15, wherein the connector port is configured to detachably couple the sensor assembly to the connector module.

23. The configurable non-contact position sensor of claim 12, wherein the connector port is configured to allow a first connector module to be removed and replaced with a second connector module.

* * * * *